United States Patent
Mody et al.

(10) Patent No.: US 7,891,513 B2
(45) Date of Patent: Feb. 22, 2011

(54) CONTAINER BASE WITH FEET

(75) Inventors: Ravi Mody, Ann Arbor, MI (US);
Darrin Nicholson, Adrian, MI (US);
Theodore F. Eberle, Ann Arbor, MI (US); Walter J. Strasser, Cement City, MI (US)

(73) Assignee: Amcor Limited, Abbotsford, Victoria (AU)

( * ) Notice: Subject to any disclaimer, the term of this patent is extended or adjusted under 35 U.S.C. 154(b) by 595 days.

(21) Appl. No.: 11/811,448

(22) Filed: Jun. 8, 2007

(65) Prior Publication Data

US 2008/0302758 A1 Dec. 11, 2008

(51) Int. Cl.
*B65D 1/02* (2006.01)

(52) U.S. Cl. .................. 215/375; 215/373; 220/606

(58) Field of Classification Search ......... 215/379–385, 215/373–375; 220/604, 606
See application file for complete search history.

(56) References Cited

U.S. PATENT DOCUMENTS

| | | | | |
|---|---|---|---|---|
| 3,598,270 A * | 8/1971 | Adomaitis et al. | .......... | 215/375 |
| 3,727,783 A * | 4/1973 | Carmichael | ................. | 215/375 |
| 4,978,015 A * | 12/1990 | Walker | ........................ | 215/375 |
| 5,104,706 A * | 4/1992 | Krishnakumar et al. | .. | 428/36.92 |
| 5,549,210 A * | 8/1996 | Cheng | ......................... | 215/375 |
| 5,785,197 A * | 7/1998 | Slat | .............................. | 215/375 |
| 5,850,932 A * | 12/1998 | Beck et al. | .................. | 215/375 |
| 5,906,286 A * | 5/1999 | Matsuno et al. | ............. | 215/375 |
| 6,085,924 A * | 7/2000 | Henderson | .................. | 215/375 |
| 6,213,325 B1* | 4/2001 | Cheng et al. | ................ | 215/375 |
| 6,276,546 B1* | 8/2001 | Davis et al. | ................. | 215/375 |
| 2001/0001200 A1* | 5/2001 | Zhang | ......................... | 215/375 |
| 2004/0079721 A1* | 4/2004 | Young et al. | ................ | 215/375 |

* cited by examiner

*Primary Examiner*—Sue A Weaver (57) ABSTRACT

A one-piece plastic container includes a body defining a longitudinal axis and having an upper portion, a sidewall portion and a base portion. The base portion defines a plurality of feet extending therearound. The base portion defines a contact diameter ratio of approximately 70-74% and a contact length ratio of approximately 20-23% for a plastic container having a volume capacity of approximately one (1) liter (1000 cc). According to additional features, the one-piece plastic container can have a nub defined on the base portion. For a one-piece plastic container having a volume capacity of approximately one (1) liter (1000 cc), the nub has a diameter of approximately 3-7 mm (0.12-0.28 inch), the base portion defines a contact area ratio of approximately 23-25%, and each foot defines corner transition portions each having a fillet radius of approximately 4-10 mm (0.16-0.39 inch).

20 Claims, 6 Drawing Sheets

CONTAINER BASE WITH FEET

TECHNICAL FIELD

This disclosure generally relates to plastic containers for retaining a commodity, such as a solid or liquid commodity. More specifically, this disclosure relates to a one-piece blown container having an improved base.

BACKGROUND

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left( \frac{\rho - \rho_a}{\rho_c - \rho_a} \right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Typically, an upper portion of the plastic container defines an opening. This upper portion is commonly referred to as a finish and includes some means for engaging a cap or closure to close off the opening. In the traditional injection-stretch blow molding process, the finish remains substantially in its injection molded state while the container body is formed below the finish. The finish may include at least one thread extending radially outwardly around an annular sidewall defining a thread profile. In one application, a closure member or cap may define a complementary thread, or threads, that are adapted to cooperatively mate with the threads of the finish.

In some applications, plastic containers must withstand extreme pressures, such as when containing carbonated beverages. One common design includes providing plastic containers having multiple feet-like structures formed around the base. A typical base consists of five such feet and is commonly referred to as a petaloid base.

In some instances, conventional petaloid base designs do not have the desired performance characteristics to withstand the extreme pressures of carbonated beverages, particularly when manufactured at high speeds (i.e. greater than 1,600 containers per hour for each mold cavity).

Thus, there is a need for a plastic container design that has a base capable of withstanding extreme internal pressure and thus exhibiting significant increased resistance to breakage subsequent to filling. Furthermore, there is a need to provide a container base providing increased stability to the container when empty as well as subsequent to filling.

SUMMARY

A one-piece plastic container includes a body defining a longitudinal axis and having an upper portion, a sidewall portion and a base portion. The base portion defines a plurality of feet extending therearound. The base portion defines a contact diameter ratio of approximately 70-74% and a contact length ratio of approximately 20-23% for a plastic container having a volume capacity of approximately one (1) liter (1000 cc). The sidewall portion is integrally formed with and extends from the upper portion to the base portion.

According to additional features, the one-piece plastic container can have a nub defined on the base portion. For a one-piece plastic container having a volume capacity of approximately one (1) liter (1000 cc), the nub has a diameter of approximately 4 mm (0.16 inch), the base portion defines a contact area ratio of approximately 23-25%, and each foot defines corner transition portions each having a fillet radius of approximately 4-10 mm (0.16-0.39 inch).

According to yet other features, the finish defines a means for attaching a closure thereon. The means for attaching a closure includes at least one thread. The container is composed of polyethylene terephthalate. The sidewall portion and the base portion are biaxially oriented.

Additional benefits and advantages of the present disclosure will become apparent to those skilled in the art to which the present disclosure relates from the subsequent description and the appended claims, taken in conjunction with the accompanying drawings. It will also be appreciated by those skilled in the art to which the present disclosure relates that the container of the present disclosure may be manufactured utilizing alternative blow molding processes to those disclosed.

DETAILED DESCRIPTION

The following description is merely exemplary in nature, and is in no way intended to limit the disclosure or its application or uses.

Figure 1:
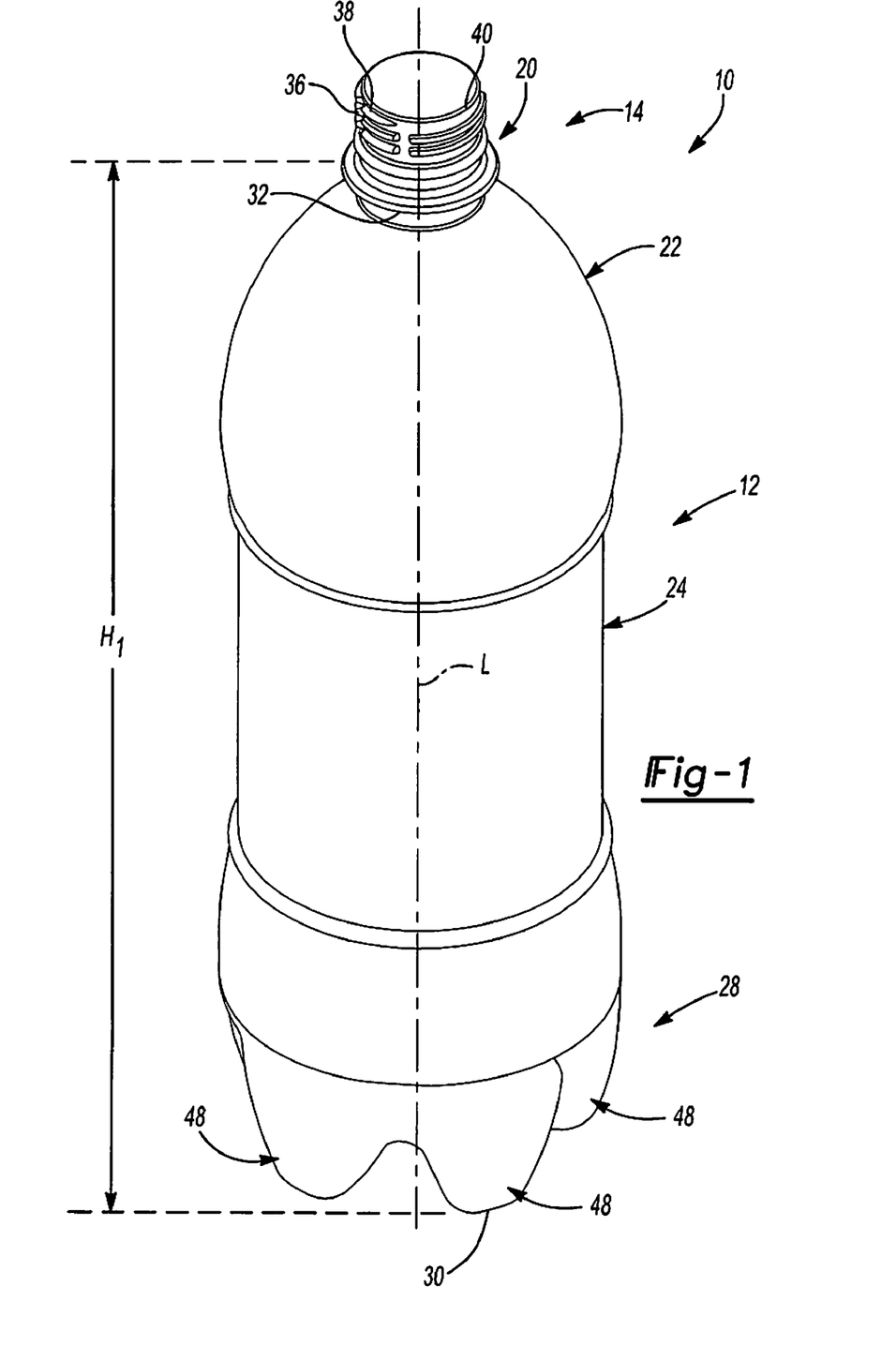
FIG. 1 is a side elevational view of a one-piece plastic container constructed in accordance with the teachings of the present disclosure.

FIGS. 1-5 show one preferred embodiment of the present container. In the Figures, reference number 10 designates a one-piece plastic, e.g. polyethylene terephthalate (PET), container. As shown in FIG. 1, the plastic container 10 has an overall height $H_1$ of about 266.45 mm (10.49 inches). The plastic container 10 can define a longitudinal axis L and be substantially cylindrical in cross section. In this particular embodiment, the plastic container 10 has a volume capacity of about one (1) liter (1000 cc). Those of ordinary skill in the art would appreciate that the following teachings of the present disclosure are applicable to other containers, such as rectangular, triangular, hexagonal, octagonal or square shaped containers, which may have different dimensions and volume capacities. It is also contemplated that other modifications can be made depending on the specific application and environmental requirements.

As shown in FIG. 1, the one-piece plastic container 10 according to the present teachings defines a body 12, and includes an upper portion 14 having a finish 20. Integrally formed with the finish 20 and extending downward therefrom is a shoulder region 22. The shoulder region 22 merges into and provides a transition between the finish 20 and a sidewall portion 24. The sidewall portion 24 extends downward from the shoulder region 22 to a base portion 28 having a base 30.

A neck 32 may also be included having an extremely short height, that is, becoming a short extension from the finish 20, or an elongated height, extending between the finish 20 and the shoulder region 22. The finish 20 of the plastic container 10 includes a threaded region 36 having at least one thread 38 formed on an annular sidewall 40. The threaded region 36 provides a means for attachment of a similarly threaded closure or cap (not shown). The cap can define at least one thread formed around an inner diameter for cooperatively riding along the thread(s) 38 of the finish 20. Alternatives may include other suitable devices that engage the finish 20 of the plastic container 10. Accordingly, the closure or cap engages the finish 20 to preferably provide a hermetical seal of the plastic container 10. The closure or cap is preferably of a plastic or metal material conventional to the closure industry and suitable for subsequent thermal processing, including high temperature pasteurization and retort.

The plastic container 10 has been designed to retain a commodity. The commodity may be in any form such as a solid or liquid product. In one example, a liquid commodity may be introduced into the container during a thermal process, typically a hot-fill process. For hot-fill bottling applications, bottlers generally fill the plastic container 10 with a liquid or product at an elevated temperature between approximately 155° F. to 205° F. (approximately 68° C. to 96° C.) and seal the plastic container 10 with a cap or closure before cooling. In addition, the plastic container 10 may be suitable for other high-temperature pasteurization or retort filling processes or other thermal processes as well. In another example, the commodity may be introduced into the plastic container 10 under ambient temperatures.

The plastic container 10 of the present disclosure is an injection-stretch blow molded, biaxially oriented container with a unitary construction from a single or multi-layer material. A well-known stretch-molding, heat-setting process for making the one-piece plastic container 10 generally involves the manufacture of a preform 44 (FIG. 6) of a polyester material, such as polyethylene terephthalate (PET), having a shape well known to those skilled in the art similar to a test-tube with a generally cylindrical cross section and a length typically approximately fifty percent (50%) that of the resultant container height. In one example, the preform 44 can be injection molded. As will be appreciated, the upper portion 14 remains substantially unchanged from its preform state while the container body 12 is formed below the finish 20. An exemplary method of manufacturing the plastic container 10 will be described in detail below.

With specific reference now to FIGS. 2-5, the base portion 28 will be described in detail. The base portion 28 defines a radial sidewall 46 having a diameter $D_1$. The base portion 28 includes a plurality of feet 48. The feet 48 centrally converge at a nub 50. In the exemplary plastic container 10 shown, there are five feet 48 defining a petaloid base. Each foot 48 includes a central portion 54 (FIG. 3), a radial transition portion 56, a pair of corner transition portions 58, and a pair of lateral transition portions 60. The pair of corner transition portions 58 can define a fillet radius $R_1$ (FIG. 3). Each central portion 54 defines a contact surface 66. The contact surface 66 is generally planar and defines a contact surface area, shown shaded at reference numeral 68.

Figure 2:
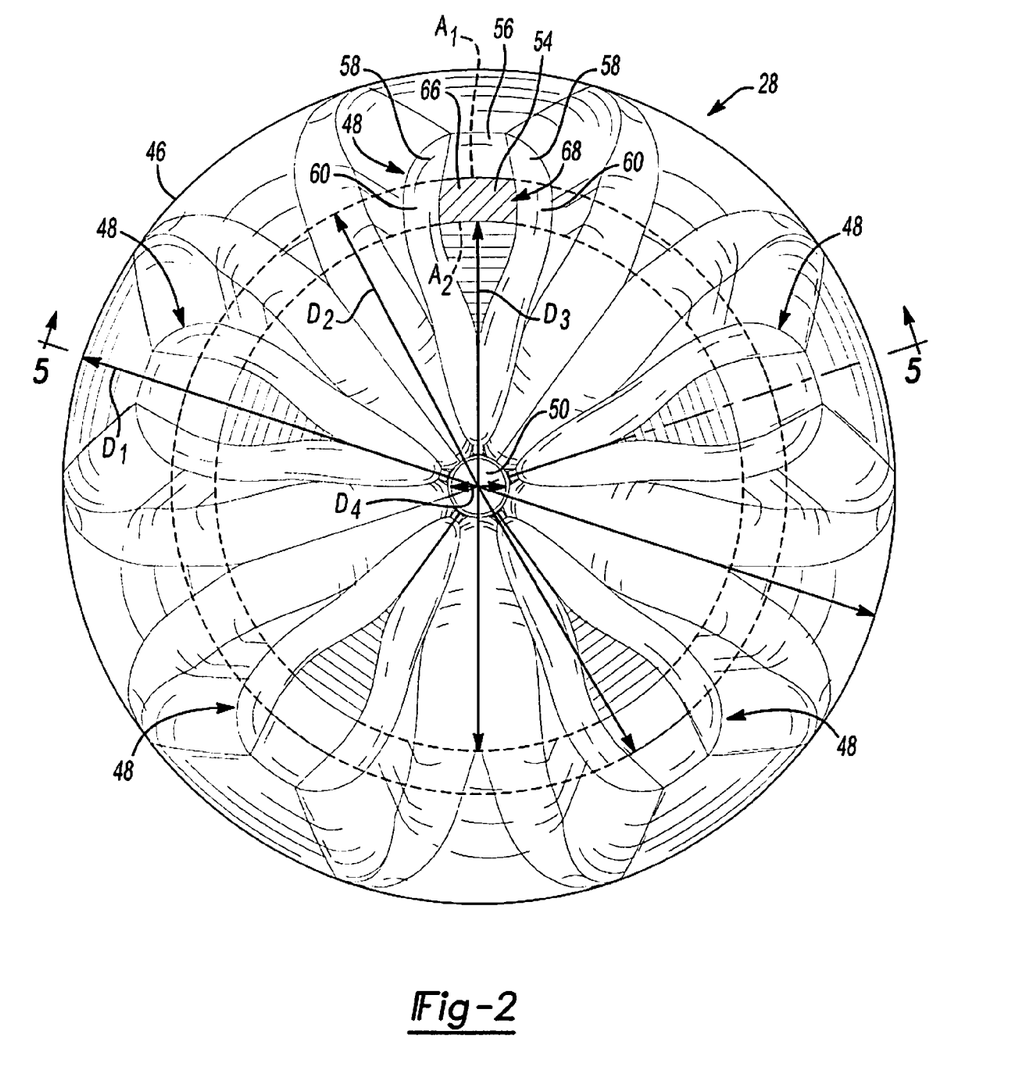
FIG. 2 is a bottom view of the plastic container of FIG. 1 illustrating a container base.
Figure 3:
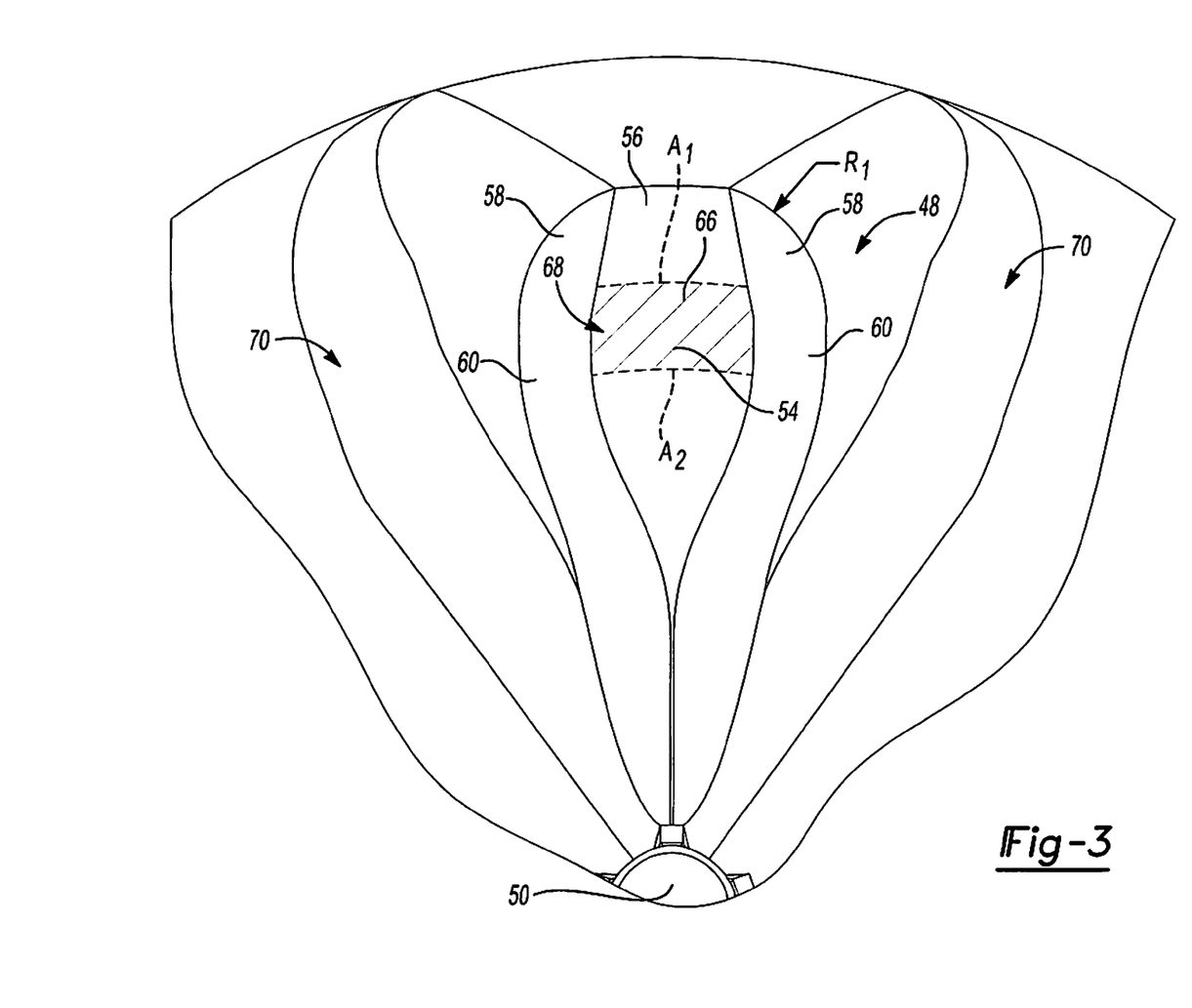
FIG. 3 is a detail view of a portion of the container base of FIG. 2.
Figure 4:
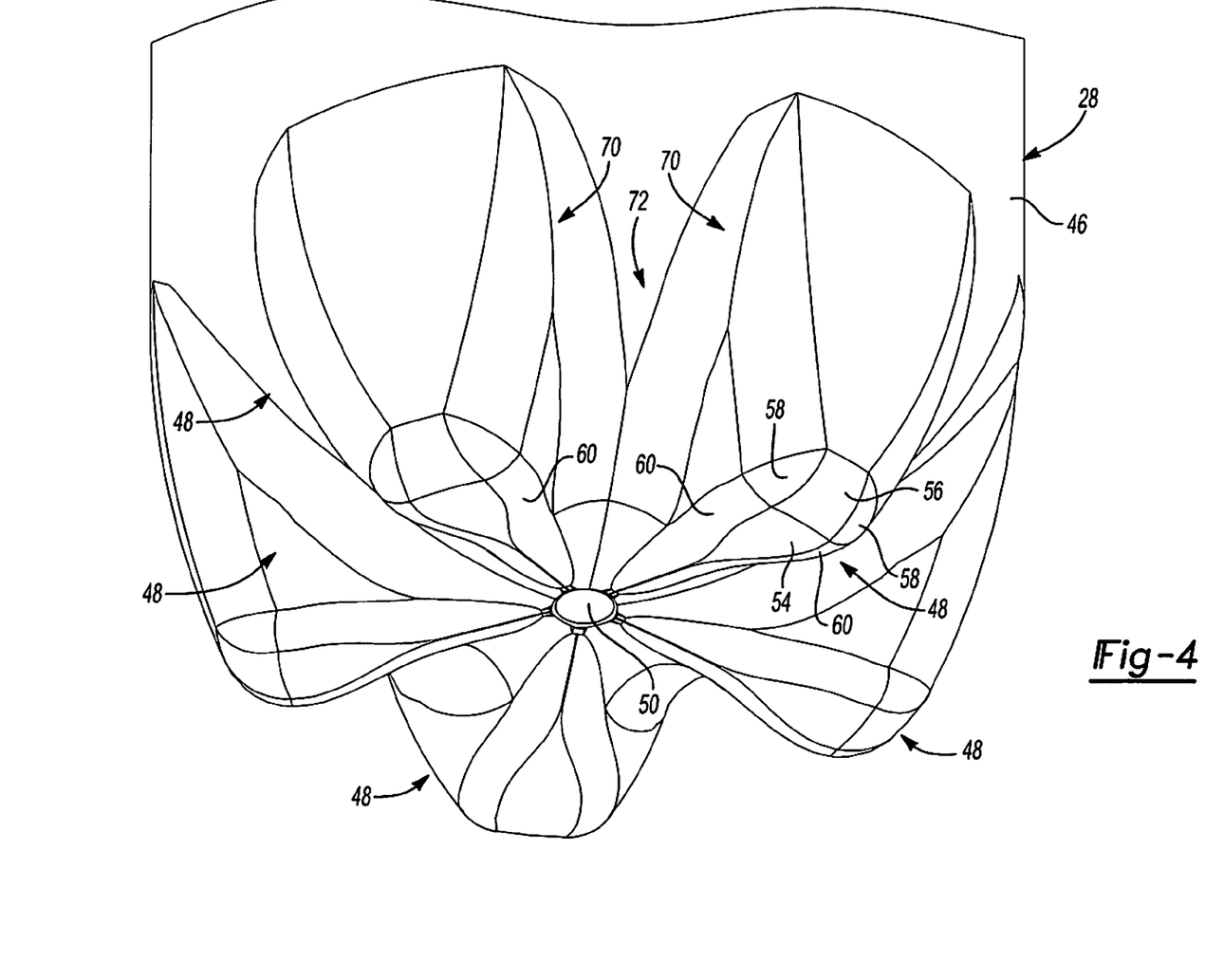
FIG. 4 is a side perspective view of a base portion of the container of FIG. 1.

With reference to FIG. 2, the contact surface area 68 is defined radially between a first contact diameter $D_2$ and a second contact diameter $D_3$. Arclengths $A_1$ and $A_2$ are defined at an outer and inner radial boundary, respectively, of the contact surface 66. The contact surface area 68 is also defined laterally between the lateral transition portions 60. As can be appreciated, a plastic container 10 standing in an upright position (FIG. 1), will have one contact surface 66 per foot 48 in contact with an opposing supporting surface (i.e., a table etc.). In the petaloid base portion 28 of the instant disclosure, five (5) contact surfaces 66 are arranged for contact with an opposing supporting surface. Undulations 70 (FIGS. 3 and 4) generally extend between each foot 48 and the radial sidewall 46 of the base portion 28 (FIG. 4). The undulations 70 are generally separated by strap areas 72.

Figure 5:
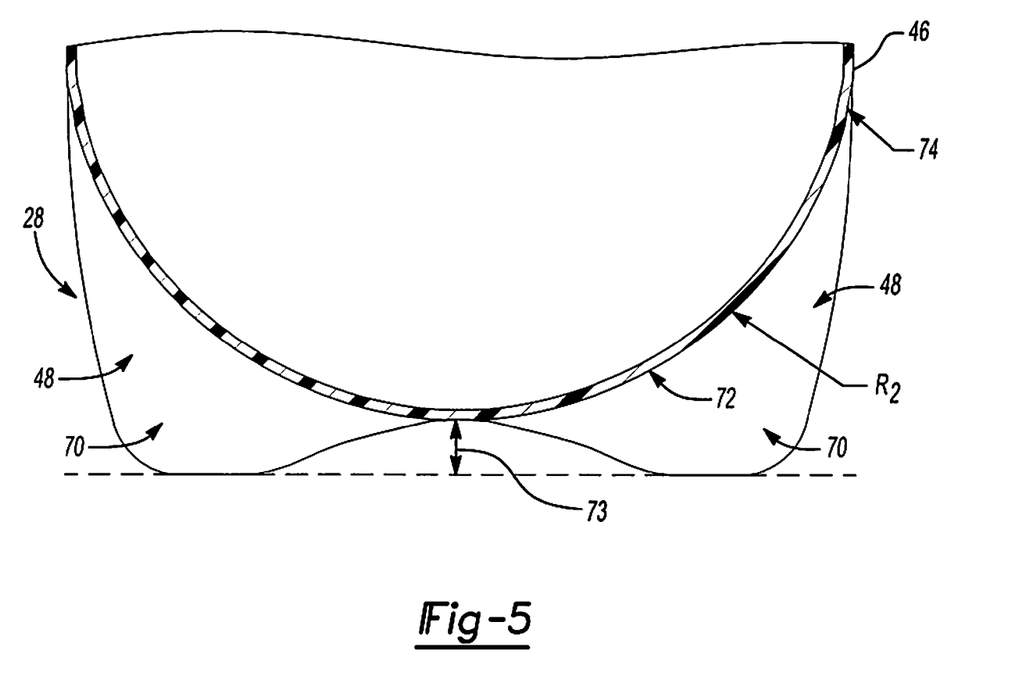
FIG. 5 is a sectional profile view of the base portion of the container taken along line 5-5 of FIG. 2.

With reference to FIG. 5, a profile of the petaloid base portion 28 is shown. A hemispherical radius $R_2$ is generally defined through the strap area 72. The petaloid base portion 28 includes a hemispherical portion whose diameter is equal to the desired container diameter. The hemispherical radius $R_2$ is perpendicular to the desired plane of base clearance 73. The base clearance 73 is defined as the vertical distance from the bottom of the feet 48 up to the nub 50 and its value is dependent on the container diameter and the resulting internal pressure inside the container 10. The base clearance 73 generally increases with an increase in container diameter and is a function of internal pressure inside the container 10. In general, the higher the internal pressure, the higher the base clearance 73 for a given container diameter. The petaloid base portion 28 also defines a conical section 74, which is angled between a range of 10 to 20 degrees relative to the radial sidewall 46. The length of the conical section 74 varies and is usually between 10-20% of the length of the hemispherical section. At an intersection of the hemispherical radius and the conical section 74, the conical section 74 is truncated at the point of tangency. This geometry in combination with the foot profile construction defines the pressure resistant base geometry that is capable of withstanding elevated pressures and temperatures, highly resistant to stress crack related post fill delayed breakage incidents, provides increased stability, and significantly enhances container process ability at high blow-molding speeds.

The petaloid base portion 28 defines various geometrical relationships that are represented by the following formulas:

$$ContactDiameterRatio = \frac{D_2}{D_1}$$

-continued $$ContactAreaRatio = \frac{ContactSurfaceArea}{\Pi(D_2^2 - D_3^2)/4} * 5$$

$$ContactLengthRatio = \frac{A_1}{\Pi(D_2)} * 5$$

The following geometries are shown for a plastic container constructed in accordance with the present teachings and having a volume capacity of approximately one (1) liter (1000 cc). The petaloid base portion 28 provides a contact diameter ratio of approximately 0.70-0.74. The contact area ratio may be approximately 0.23-0.25. The contact length ratio may be approximately 0.20-0.23. A diameter $D_4$ of the nub 50 may be 3-7 mm (0.12-0.28 inch). The fillet radius $R_1$ may be 4-10 mm (0.16-0.39 inch). It is appreciated that these geometries may be slightly lower or higher.

PET bottles exhibit a phenomenon of stress cracking. Stress cracking or crazing can occur when a PET container is under tensile stress, in its weakest state, and/or when subjected to negative conditions. The weakest state for a stretch blow-molder container is generally the base/gate area of a container as here the material is in an amorphous state. Such a container when filled, such as with a carbonated beverage and exposed to certain negative environmental conditions (incompatible line lubes and/or water) could lead to cracks in the base of the container, which could eventually lead to rupture of the container in the base.

Stress crack resistance is quantified by an industry standard "time to failure" test. In general, the "time to failure" test includes pressurizing a given plastic container such as with carbonated water. The base portion of the pressurized plastic container is dipped into a caustic solution (such as a sodium hydroxide solution). Failure is defined as any leak or loss of pressure in the plastic container. Table 1, illustrated below, shows significant improvement in the time to failure for the plastic container 10 having a petaloid base portion 28 according to the present teachings.

TABLE 1

| Container Size | Conventional Container Time to Failure (min) | Container 10 Time to Failure (min) |
|---|---|---|
| 0.5 L | 24 | 60 |
| 1 L | 4-54 | 164-169 |
| 3 L | 10-13 | 121-157 |

The plastic container 10 molded with the geometrical relationships according to the instant disclosure can be produced on high-speed blow-molding production platforms without compromising the functionality of the petaloid base portion 28 or the resultant container 10 as a whole. In particular, significant distortion to the base geometry may occur with conventional plastic containers that are produced at high machine speeds (such as greater than 1,600 bottles per cavity per hour). Those skilled in the art can appreciate that the distortion severity increases with increased machine speed. The distortion severity can result from decreased in-mold cooling resistance time. Ultimately, the risk for post-filling delayed breakage stress crack incidents in the base portion is increased with increased machine speed. Further, distortion around the base portion of the plastic container also negatively impacts the plastic container performance under high pressure (such as for carbonated beverages).

Figure 6:
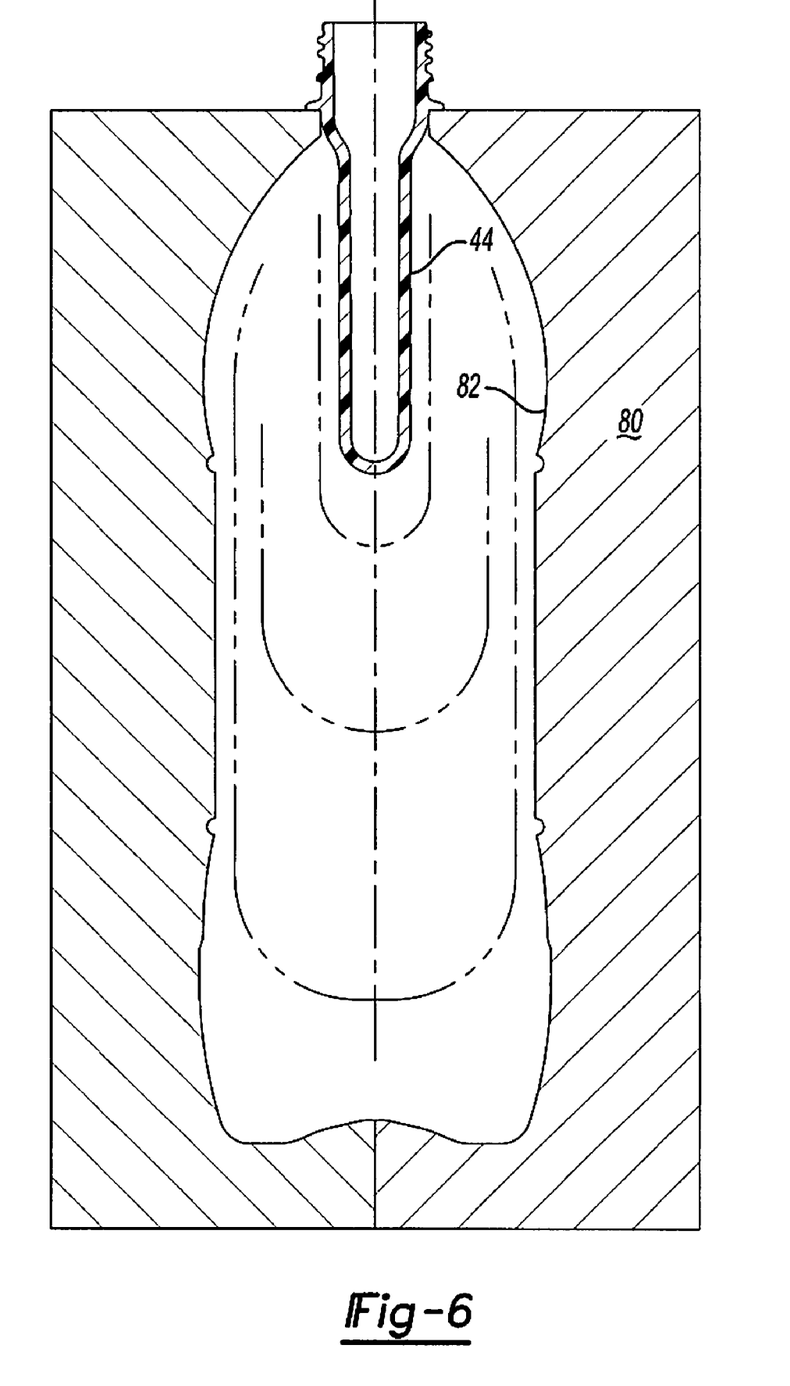
FIG. 6 is a sectional view of an exemplary mold cavity used during formation of the container of FIG. 1 and shown with a preform positioned therein.

In one example, a machine (not illustrated) places the preform 44 heated to a temperature between approximately 190° F. to 250° F. (approximately 88° C. to 121° C.) into a mold cavity 80. The mold cavity 80 may be heated to a temperature between approximately 250° F. to 350° F. (approximately 121° C. to 177° C.). A stretch rod apparatus (not illustrated) stretches or extends the heated preform 44 within the mold cavity 80 to a length approximately that of the resultant plastic container 10 thereby molecularly orienting the polyester material in an axial direction generally corresponding with the central longitudinal axis L of the plastic container 10. Again, during the stretching process, the finish 20 remains unchanged in an injection molded state while the container body 12 is formed below the finish 20. While the stretch rod extends the preform 44, air having a pressure between 300 PSI to 600 PSI (2.07 MPa to 4.14 MPa) assists in extending the preform 44 in the axial direction and in expanding the preform 44 in a circumferential or hoop direction thereby substantially conforming the polyester material to the shape of the mold cavity 80 and further molecularly orienting the polyester material in a direction generally perpendicular to the axial direction, thus establishing the biaxial molecular orientation of the polyester material in most of the plastic container 10. The pressurized air holds the mostly biaxial molecularly oriented polyester material against a mold surface 82 of the mold cavity 80 for a period of approximately two (2) to five (5) seconds before removal of the plastic container 10 from the mold cavity 80. This process is known as heat setting and results in a heat-resistant container suitable for filling with a product at high temperatures.

In another example, a machine (not illustrated) places the preform 44 heated to a temperature between approximately 185° F. to 239° F. (approximately 85° C. to 115° C.) into the mold cavity 80. The mold cavity 80 may be chilled to a temperature between approximately 32° F. to 75° F. (approximately 0° C. to 24° C.). A stretch rod apparatus (not illustrated) stretches or extends the heated preform 44 within the mold cavity 80 to a length approximately that of the resultant plastic container 10 thereby molecularly orienting the polyester material in an axial direction generally corresponding with the central longitudinal axis L of the plastic container 10. Again, during the stretching process, the finish 20 remains unchanged in an injection molded state while the container body 12 is formed below the finish 20. While the stretch rod extends the preform 44, air having a pressure between 300 PSI to 600 PSI (2.07 MPa to 4.14 MPa) assists in extending the preform 44 in the axial direction and in expanding the preform 44 in a circumferential or hoop direction thereby substantially conforming the polyester material to the shape of the mold cavity 80 and further molecularly orienting the polyester material in a direction generally perpendicular to the axial direction, thus establishing the biaxial molecular orientation of the polyester material in most of the plastic container 10. The pressurized air holds the mostly biaxial molecularly oriented polyester material against the mold surface 82 of the mold cavity 80 for a period of approximately two (2) to five (5) seconds before removal of the plastic container 10 from the mold cavity 80. This process is utilized to produce containers suitable for filling with product under ambient conditions or cold temperatures.

Alternatively, other manufacturing methods using other conventional materials including, for example, high density polyethylene, polypropylene, polyethylene naphthalate (PEN), a PET/PEN blend or copolymer, and various multilayer structures may be suitable for the manufacture of the plastic container 10. Those having ordinary skill in the art will readily know and understand plastic container manufacturing method alternatives.

While the above description constitutes the present disclosure, it will be appreciated that the disclosure is susceptible to modification, variation and change without departing from the proper scope and fair meaning of the accompanying claims.

What is claimed is:

1. A one-piece plastic container comprising:
a body defining a longitudinal axis and having an upper portion, a sidewall portion and a base portion, said base portion defining a plurality of feet extending therearound, said sidewall portion having a first diameter ($D_1$), said feet each defining a respective contact surface operable to contact a support surface of the container, each of said contact surfaces having a respective outer radial boundary ($A_1$), a second diameter ($D_2$) being defined by said respective outer radial boundaries ($A_1$) of said respective contact surfaces, wherein said base portion defines a contact diameter ratio according to:

Contact Diameter Ratio=$D_2/D_1$, wherein said base portion defines a contact length ratio according to:

Contact Length Ratio=$(A_1/\pi(D_2))*5$, said contact diameter ratio being equal to approximately 0.70-0.74 and a contact length ratio equal to approximately 0.20-0.23.

2. The one-piece plastic container of claim 1 wherein said sidewall portion is integrally formed with and extends from said upper portion to said base portion, said base portion closing off an end of the container.

3. The one-piece plastic container of claim 2 wherein the one-piece plastic container has a volume of approximately 1 liter (1000 cc) and wherein said base portion defines a nub having a diameter of approximately 3-7 mm (0.12-0.28 inch).

4. The one-piece plastic container of claim 2, wherein each of said contact surfaces has a contact surface area, wherein each of said contact surfaces has a respective inner radial boundary ($A_2$), wherein a third diameter ($D_3$) is defined by said respective inner radial boundaries ($A_2$) of said respective contact surfaces, wherein said base portion defines a contact area ratio according to:

$$ContactAreaRatio = \frac{ContactSurfaceArea}{\Pi(D_2^2 - D_3^2)/4} * 5$$

the contact area ratio being approximately 0.23-0.25.

5. The one-piece plastic container of claim 2 wherein each of said plurality of feet define a corner transition portion having a fillet radius of approximately 4-10 mm (0.16-0.39 inch).

6. The one-piece plastic container of claim 2 wherein said plurality of feet consists of five feet.

7. The one-piece plastic container of claim 2 further comprising a finish, wherein said finish defines a means for attaching a closure thereon.

8. The one-piece plastic container of claim 7 wherein said means for attaching a closure includes at least one thread.

9. The one-piece plastic container of claim 1 wherein the container is composed of polyethylene terephthalate.

10. The one-piece plastic container of claim 9 wherein said sidewall portion and said base portion are both biaxially oriented.

11. A one-piece plastic container comprising:
an upper portion having a finish;
a shoulder region integrally formed with and extending from said upper portion;
a sidewall portion defining a longitudinal axis and extending from said shoulder region, said sidewall portion having a first diameter ($D_1$);
a base portion extending from said sidewall portion and closing off an end of the container; and
wherein said base portion defines a plurality of feet extending therearound, said feet each defining a respective contact surface operable to contact a support surface of the container, each of said contact surfaces having a contact surface area, each of said contact surfaces having a respective outer radial boundary ($A_1$), a second diameter ($D_2$) being defined by said respective outer radial boundaries ($A_1$) of said respective contact surfaces, said base portion defining a contact diameter ratio according to:

Contact Diameter Ratio=$D_2/D_1$, wherein each of said contact surfaces has a respective inner radial boundary ($A_2$), wherein a third diameter ($D_3$) is defined by said respective inner radial boundaries ($A_2$) of said respective contact surfaces, wherein said base portion defines a contact area ratio according to:

$$ContactAreaRatio = \frac{ContactSurfaceArea}{\Pi(D_2^2 - D_3^2)/4} * 5$$

said contact diameter ratio being equal to approximately 0.70-0.74 and said contact area ratio being approximately 0.23-0.25.

12. The one-piece plastic container of claim 11 wherein said sidewall portion is integrally formed with and extends from said upper portion to said base portion.

13. The one-piece plastic container of claim 12 wherein the one-piece plastic container has a volume of approximately 1 liter (1000 cc) and wherein said base portion defines a nub having a diameter of approximately 3-7 mm (0.12-0.28 inch).

14. The one-piece plastic container of claim 12 wherein each of said plurality of feet define a corner transition portion having a fillet radius of approximately 4-10 mm (0.16-0.39 inch).

15. The one-piece plastic container of claim 11 wherein said plurality of feet consists of five feet.

16. The one-piece plastic container of claim 11 wherein the container is composed of polyethylene terephthalate.

17. The one-piece plastic container of claim 11 wherein said sidewall portion and said base portion are both biaxially oriented.

18. A method of making a blow-molded plastic container comprising:
disposing a preform into a mold cavity; and
blowing said preform against a mold surface of said mold cavity to form an upper portion, a sidewall portion and a base portion, said sidewall portion integrally formed with and extending between said upper portion and said base portion, said base portion closing off an end of the container, said base portion having a plurality of feet, said sidewall portion having a first diameter ($D_1$), said feet each defining a respective contact surface operable to contact a support surface of the container, each of said contact surfaces having a respective outer radial boundary ($A_1$), a second diameter ($D_2$) being defined by said respective outer radial boundaries ($A_1$) of said respective contact surfaces, said base portion defining a contact diameter ratio according to:

Contact Diameter Ratio=$D_2/D_1$, wherein said base portion defines a contact length ratio substantially according to:

Contact Length Ratio=$(A_1/\pi(D_2))*5$, said contact diameter ratio being equal to approximately 0.70-0.74 and a contact length ratio equal to approximately 0.20-0.23.

19. The method of claim 18, wherein each of said contact surfaces has a contact surface area, wherein each of said contact surfaces has a respective inner radial boundary ($A_2$), wherein a third diameter ($D_3$) is defined by said respective inner radial boundaries ($A_2$) of said respective contact surfaces, wherein blowing said preform includes forming a base portion having a contact area ratio according to:

$$ContactAreaRatio = \frac{ContactSurfaceArea}{\Pi(D_2^2 - D_3^2)/4} * 5$$

the contact area ratio being approximately 0.23-0.25.

20. The method of claim 19 wherein blowing said preform includes forming said plurality of feet each having a corner transition portion defining a fillet radius of approximately 4-10 mm (0.16-0.39 inch).

* * * * *